United States Patent

Sugimoto et al.

[11] Patent Number: 5,055,685
[45] Date of Patent: Oct. 8, 1991

[54] INFRARED DETECTING APPARATUS

[75] Inventors: Tadashi Sugimoto, Ibaraki; Masashi Iwasawa; Yasuo Shoji, both of Otsu, all of Japan

[73] Assignee: Optex Co., Ltd., Otsu, Japan

[21] Appl. No.: 444,755

[22] Filed: Dec. 1, 1989

[51] Int. Cl.$^5$ .............................................. G01J 5/10
[52] U.S. Cl. .............................. 250/342; 250/338.3; 250/349
[58] Field of Search ................ 250/349, 342, 338.1, 250/338.3

[56] References Cited

U.S. PATENT DOCUMENTS

| | | | |
|---|---|---|---|
| 3,875,408 | 4/1975 | Posch | 250/339 |
| 4,307,388 | 12/1981 | Doenges et al. | 340/587 |
| 4,682,030 | 7/1987 | Rose et al. | 250/338 |

FOREIGN PATENT DOCUMENTS 8607449 12/1986 Japan ................................ 250/338.3

Primary Examiner—Carolyn E. Fields
Assistant Examiner—James E. Beyer
Attorney, Agent, or Firm—Koda and Androlia

[57] ABSTRACT

An infrared detecting apparatus which includes an infrared filter which intercepts visible light and transmits infrared rays having at least two infrared detecting elements for receiving infrared rays transmitted through the filter and converting the received infrared rays into an electric signal and an electronic circuit which amplifies the difference signal supplied from the infrared detecting elements so that the relative positional relationship between the infrared detecting elements and the infrared filter which allows for the solid angle extending from an arbitrary point on the infrared filter to the peripheral edge of the infrared detecting element's receiving surface to be not greater or less than a specific range.

5 Claims, 5 Drawing Sheets

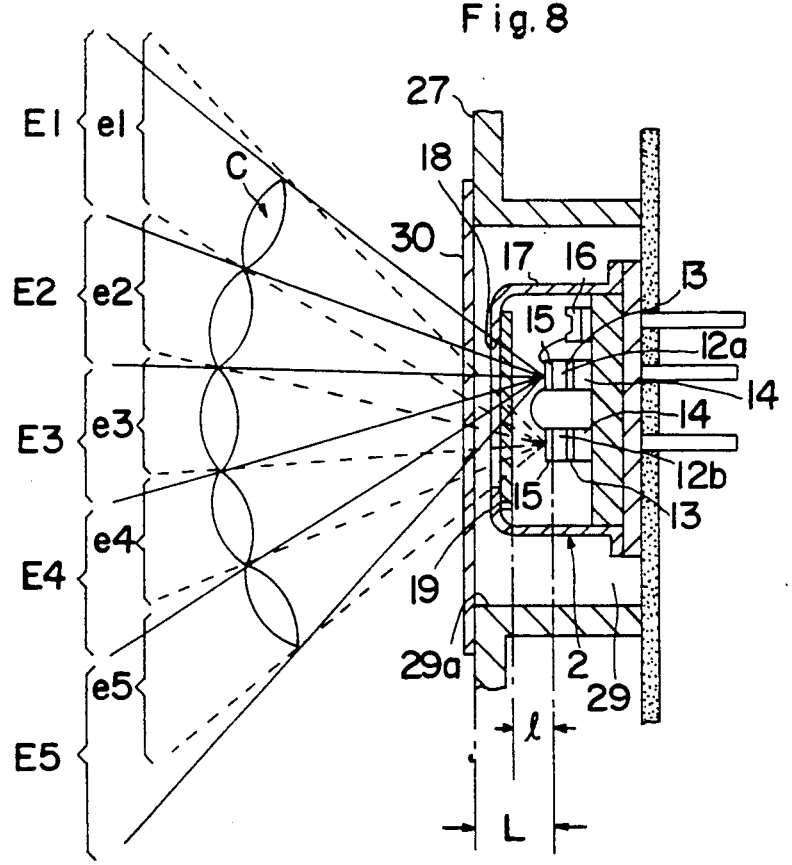
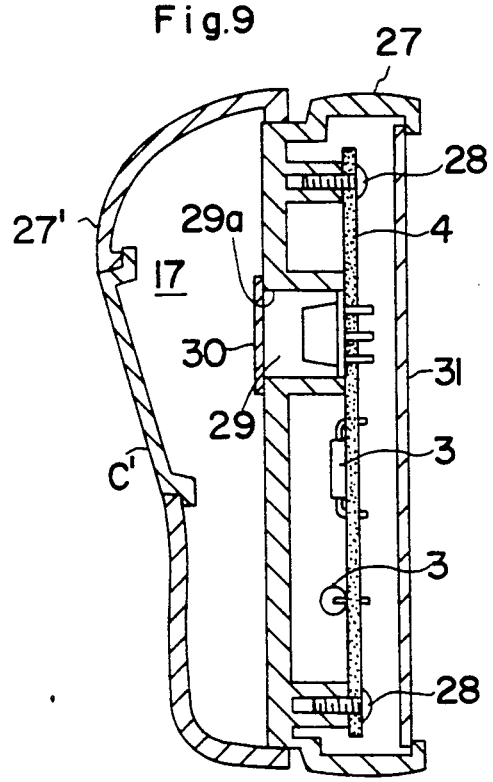

INFRARED DETECTING APPARATUS

BACKGROUND OF THE INVENTION

The present invention relates to infrared detecting apparatus which is one of component elements of a moving human body sensor for sensing the infrared rays radiated from the human body, thus detecting the entry and the leaving of the moving human body into and from the supervisory area.

As generally shown in FIG. 11, such a moving human body sensor comprises an infrared detecting apparatus 1 and an optical system C disposed at the light incident side of the apparatus 1. In the infrared detecting apparatus 1, a shield case 5 having an opening 8 incorporates a circuit board 4 having an infrared detecting unit 2 and a variety of electronic elements 3 mounted thereon. The opening 8 is sealed by a transparent plate 9 to form a light receiving window. The circuit on the circuit board 4 is electrically connected to an external circuit through a cable 7 guided to the outside through a hole 6 in the shield case 5.

The infrared detecting unit 2 incorporates a pair of infrared detecting elements 12a, 12b having the same characteristics made of a pyroelectric material and differentially connected to each other, these elements 12a, 12b being disposed for converting incident infrared rays into electric signals. The infrared detecting unit 2 also incorporates a field-effect transistor 16 for amplifying signals supplied from the infrared detecting elements 12a, 12b. The infrared detecting elements 12a, 12b and the field-effect transistor 16 are covered with a case 17 having an optical filter 19 disposed at an infrared receiving opening 18, the optical filter 19 being adapted to transmit infrared rays only and to intercept visible light. The infrared detecting elements 12a, 12b have surface electrodes 15, conductive element support stands 14 and conductive adhesives 13. The optical filter 19 has its front surface coated with a reflectionless material, and its rear surface coated with multi-layer membranes as a band pass filter surface through which wavelengths of 6 to 14 $\mu$m pass.

The optical system C comprises a convex lens group or a Fresnel lens group having different visual field groups, each being composed of, for example, five differently directed visual fields E1 to E5 or e1 to e5 as illustrated in FIG. 11. Incident infrared rays along two visual field groups formed by this lens group, pass through the light receiving window (the transparent plate 9) of the infrared detecting apparatus 1 and the optical filter 19 of the infrared detecting unit 2. Then, the infrared rays are condensed on the infrared detecting elements 12a, 12b.

The human body moving in a place sufficiently remote from the optical system C, successively passes visual fields belonging to the different visual field groups of the optical system C. Accordingly, detection signals of the infrared detecting elements 12a, 12b are supplied with certain time delays. On the other hand, there exists external disturbing light resulting from the irradiation of the sunlight or the headlights of travelling vehicles, or the radiation from the floor of the supervisory area. Such external disturbing light simultaneously covers visual fields belonging to the different visual field groups in a broad area. As a matter of fact, the infrared detecting elements 12a, 12b simultaneously receive infrared rays having the same intensity, and simultaneously supply signals in the same level. Accordingly, no signal is supplied from the infrared detecting unit 2 in which the infrared detecting elements 12a, 12b are differentially connected to each other. The visual portion of the external disturbing light is intercepted by the optical filter 19.

The moving human body sensor is originally adapted to detect the moving human body only under no influence of external disturbing light. However, there are instances where such sensor is erroneously operated due to external disturbing light such as the lighting of a patrol guard or the headlights of travelling vehicles.

Such an erroneous operation is caused by the fact that the moving human body sensor incorporates the optical system C. Since infrared rays are condensed on the infrared detecting elements 12a, 12b by the optical system C, the energy density of the infrared beam passing through the optical filter 19 is relatively high. Accordingly, the infrared rays are absorbed in the course of the transmission thereof through the optical filter 19. This causes the optical filter 19 to locally radiate heat, resulting in radiation of secondary infrared rays.

To arrange the entire infrared detecting unit 2 in a compact design, the optical filter 19 is disposed with a distance l as short as 0.5 to 1.5 mm provided between the optical filter 19 and the infrared detecting elements 12a, 12b. Accordingly, the spreading angles $\theta'_1$, $\theta'_2$ of light from a heat radiating part 19a of the optical filter 19 to the infrared detecting elements 12a, 12b are considerably different from each other, as shown by a chain line in FIG. 5. This produces a great difference between the amounts of secondary infrared rays received by the infrared detecting elements 12a, 12b. As a result, there is erroneously supplied a signal similar to a signal to be supplied when the moving human body is detected.

An infrared detecting apparatus having a single infrared detecting element, may also be erroneously operated due to the reaction of the infrared detecting element to the secondary heat radiation energy of the optical filter.

In the moving human body sensor, the infrared detecting unit 2 is electromagnetically shielded by the shield case 5. However, the shielding effect is insufficient since the transparent plate 9 serving as the light receiving window of the shield case 5 is not conductive. Accordingly, the infrared detecting unit 2 and circuit elements 3 mounted on the circuit board 4 cannot be perfectly protected from jamming.

Further, the shield case 5 for housing the infrared detecting unit 2 and the like is generally made of metal. Accordingly, if the environmental conditions such as the direct shining of the sunlight, the direction and speed of a wind, undergo a sudden change, the shield case 5 sensitively reacts to such a change, thereby to produce local variations of the case temperature even in a short period of time. This produces difference in intensity among the secondary infrared rays radiated from different parts of the shield case 5. This may cause the infrared detecting elements 12a, 12b to be erroneously operated.

OBJECTS AND SUMMARY OF THE INVENTION

It is a first object of the present invention to provide an infrared detecting apparatus adapted to supply no erroneous signal under the influence of external disturbing light or the like, even though the apparatus is combined with an optical system.

It is a second object of the present invention to provide an infrared detecting apparatus adapted not to be susceptible to influence of jamming.

It is a third object of the present invention to provide an infrared detecting apparatus which achieves the first object above-mentioned with the use of a conventional infrared detecting unit without a special attaching mechanism, and which is not susceptible to influences of sudden changes in direct sunlight or air flow, thus provoking no erroneous operation.

To achieve the first object above-mentioned, the infrared detecting apparatus in accordance with the present invention is arranged such that the optical filter is disposed at a position close to the optical system so that the distance between the optical filter and the infrared detecting elements is so set as to satisfy the condition that the solid angle extending from an arbitrary point of the optical filter to the infrared detecting elements is not greater than $1/(8\pi)$ steradian. When normal infrared elements of which light receiving surfaces have sizes of 1 mm×2 mm, are used, the distance between the filter and the elements satisfying the condition above-mentioned is not less than 2 mm.

According to the arrangement above-mentioned, the distance between the optical filter and the infrared detecting elements is greater than that in the conventional infrared detecting apparatus. Accordingly, even though the infrared detecting apparatus is combined with an optical system to form a moving human body sensor of the infrared type, there are reduced differences among solid angles extending from any heat radiating parts of the optical filter to the two individual infrared detecting elements forming a detecting element pair. This reduces difference between the amounts of secondary infrared rays which the two infrared detecting elements received from the optical filter. Thus, outputs from the infrared detecting elements due to external disturbing light differ little from each other and are cancelled by each other. This prevents an erroneous signal from being outputted.

Further, since the optical filter is disposed near the optical system, the section area of an external beam irradiated to the optical filter is increased. This reduces the light condensing degree, thereby to considerably reduce local heat radiation. This considerably reduces the radiation itself of secondary infrared rays from the optical filter due to external disturbing light.

To achieve the second object above-mentioned of the present invention, the opening of the shield case for housing the infrared detecting unit is closed by a conductive optical filter, and the peripheral edge of the conductive optical filter is secured to the shield case by a conductive member such that the conductive optical filter is electrically connected to the shield case.

According to the arrangement above-mentioned, the infrared detecting unit and the circuit board having the infrared detecting unit mounted thereon (which unit and board are housed in the shield case), may be perfectly shielded. This substantially perfectly eliminates the influence of jamming.

To achieve the third object above-mentioned of the present invention, the housing of the apparatus may be made of, for example, conductive plastic which is not susceptible to sudden changes in the direct sunlight or the outside air temperature, and the conventional infrared detecting unit is inserted and housed in a housing space integrally formed in this housing, and the optical filter is secured to this housing space so that the opening thereof is closed to seal the housing space.

Alternatively, the conventional infrared detecting unit may be covered with a protective member having an opening made of a material different from that of the case body of the infrared detecting unit, and the optical filter may be secured to the protective member such that the opening thereof is closed to seal the inside of the protective member.

According to the arrangement above-mentioned, the optical filter also serves as a sealing member so that the conventional infrared detecting unit is sealed in the housing space. This eliminates a need for a mechanism dedicated for attaching the infrared detecting unit. Further, it is possible to restrain the infrared detecting elements from being influenced by sudden changes in the direct sunlight or an air flow, thereby to prevent an erroneous operation of the apparatus due to such sudden environmental changes.

BRIEF DESCRIPTION OF THE DRAWINGS

FIG. 8 is a section view in right-side elevation of an infrared detecting apparatus in accordance with a third embodiment of the present invention, as applied to a moving human body sensor of the infrared type;

FIG. 9 is a section view in right-side elevation, illustrating the entire arrangement of the apparatus in FIG. 8;

DETAILED DESCRIPTION OF THE INVENTION

The following description will discuss preferred embodiments of the present invention with reference to the attached drawings.

Figure 1:
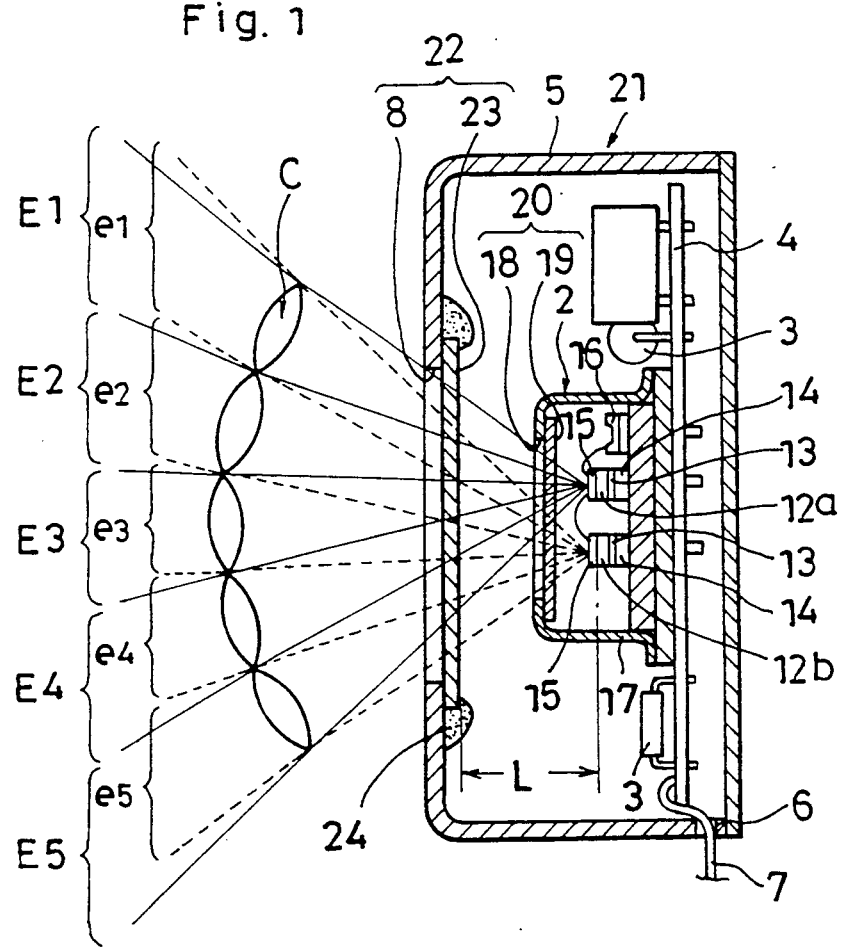
FIG. 1 is a section view in right-side elevation of an infrared detecting apparatus in accordance with a first embodiment of the present invention, as applied to a moving human body sensor of the infrared type.

FIG. 1 is a section view in right-side elevation of the infrared detecting apparatus in accordance with a first embodiment of the present invention, as applied to a moving human body sensor of the infrared type. In FIG. 1, like parts and substantially equivalent parts are designated by like reference numerals used in FIG. 11. The description of such like parts and substantially equivalent parts is here omitted, and the following description will discuss the component elements different from those in FIG. 11.

An infrared detecting apparatus 21 of the present invention has a light incident portion 22. In the light incident portion 22, an opening 8 of a shield case 5 is closed, from the inside thereof, by a conductive optical filter 23 made of silicon, germanium or the like which transmits infrared rays only. The periphery of the conductive optical filter 23 is secured to the shield case 5 with the use of a conductive member 24 such as conductive paints, conductive adhesives, conductive seals, so that the conductive optical filter 23 is electrically connected to the shield case 5. Accordingly, the inside of the shield case 5 is electrically shielded so that an infrared detecting unit 2 and a circuit board 4 having the infrared detecting unit 2 mounted thereon (which unit 2 and board 4 are incorporated in the shield case 5), are substantially perfectly protected from influences of jamming.

The conductive optical filter 23 disposed outside of the infrared detecting unit 2 is positioned such that the distance L between the conductive optical filter 23 and infrared detecting elements 12a, 12b is so set as to satisfy the condition that the solid angle where the infrared detecting elements 12a, 12b are seen from an arbitrary point of the conductive optical filter 23, is not greater than $1/(8\pi)$ steradian.

The infrared detecting elements 12a, 12b are not limited to pyroelectric elements, but may be other elements as far as they are capable of converting the incident infrared rays into electric signals according to the variation amounts thereof. For example, there may be used elements of the thermopile type using a thermoelectromotive force (of the thermocouple type).

As an optical system C to be combined with the infrared detecting apparatus 21, there may be used not only a split lens as shown in FIG. 1, but also a split mirror or a combination of a plurality of lenses with a plurality of mirrors. Further, the infrared detecting unit may have a single infrared detecting element. Since the conductive optical filter 23 transmits infrared rays only as mentioned earlier, it is not specially required to dispose the optical filter 19 at an opening 18 of the infrared detecting unit 2, as done in the conventional apparatus. Accordingly, the opening 18 may be sealed with a sealing member which transmits at least infrared rays, instead of the optical filter 19.

Figure 2:
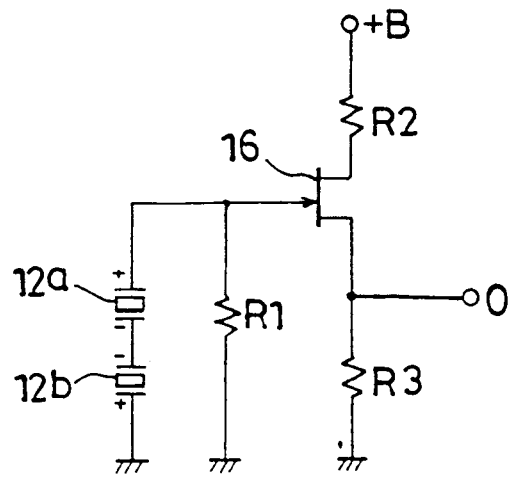
FIG. 2 is an electric circuit diagram used in the infrared detecting apparatus in FIG. 1.
Figure 3:
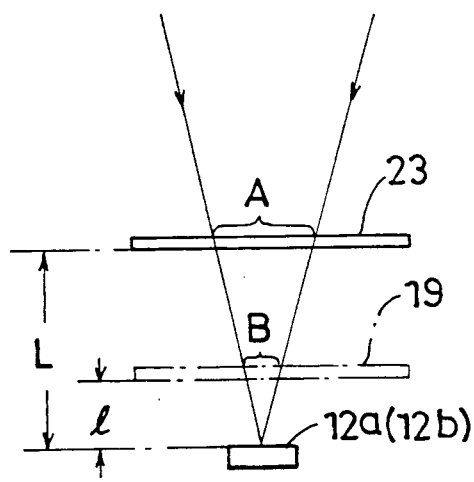
FIG. 3 is a view for comparatively illustrating the external disturbing light irradiation areas of a conductive optical filter used in the apparatus in FIG. 1 and a conventional optical filter.

FIG. 2 shows an electric circuit diagram used in the apparatus in FIG. 1.

When incident infrared rays produce electric charge on a pair of infrared detecting elements 12a, 12b differentially connected to each other, the electric charge discharges electricity through an input resistance R1 having a high resistance value. A voltage produced on the input resistance R1 is outputted, as an infrared detecting signal, from an output load resistance R3 of an impedance conversion circuit formed by a field-effect transistor 16.

The following description will discuss in detail the operation of the first embodiment of the present invention with reference to FIGS. 3 to 6.

Figure 11:
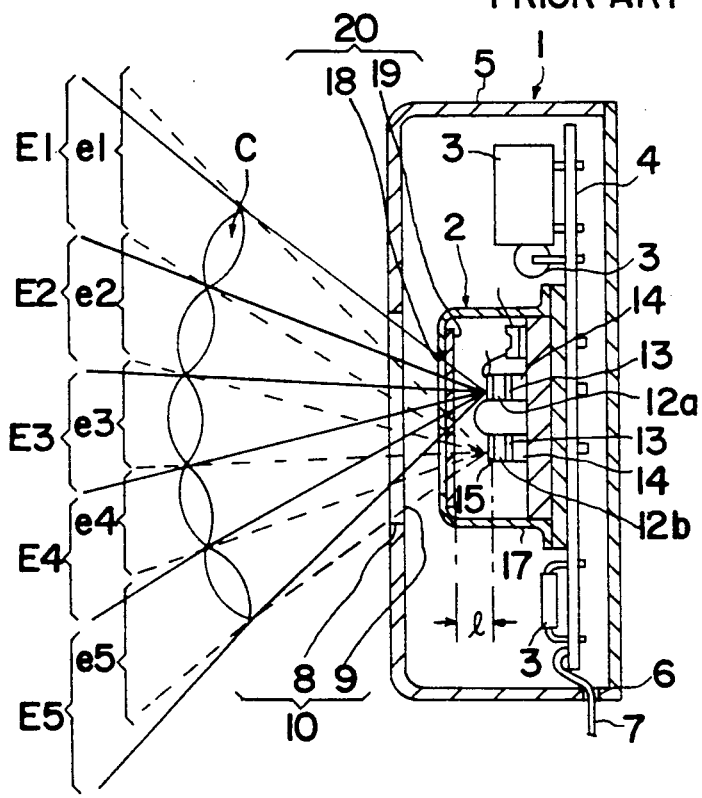
FIG. 11 is a section view in right-side elevation of a conventional moving human body sensor of the infrared type.

When external disturbing light such as the sunlight is condensed by the optical system C and irradiated on the conductive optical filter 23, the external disturbing light irradiation area A of the conductive optical filter 23 in the infrared detecting apparatus 21 is much greater than the external disturbing light irradiation area B (comparatively shown by a chain line in FIG. 3) of the optical filter 19 of the infrared detecting unit 2 in the conventional infrared detecting apparatus shown in FIG. 11. This is because the conductive optical filter 23 is disposed at a position closer to the optical system C than the optical filter 19 of the conventional infrared detecting apparatus 1 in FIG. 11. Accordingly, the condensing degree of the incident light upon the conductive optical filter 23 is reduced so that heat radiation uniformly scatters on the entire board irradiation area A. This reduces the amount of heat per unit area of the conductive optical filter 23, thereby to reduce the radiation of secondary heat. Further, the distance L between the conductive optical filter 23 and the infrared detecting elements 12a, 12b is much greater than the distance l between the optical filter 19 and the infrared detecting elements 12a, 12b in the conventional infrared detecting apparatus 1. Thus, the secondary heat radiation exerts much less influence upon the infrared detecting elements 12a, 12b of the infrared detecting apparatus 21.

The filter arrangement above-mentioned may also be effective in an infrared detecting apparatus having a single infrared detecting element in view of prevention of an erroneous operation of the apparatus due to external disturbing light.

Figure 5:
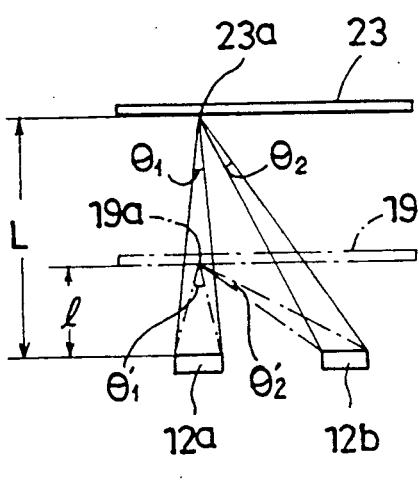
FIG. 5 is a view for comparatively illustrating the spreading angles of secondary infrared rays from the optical filters to the infrared detecting elements in the apparatus in FIG. 1 and a conventional apparatus.

As shown in FIG. 5, the distance L between the conductive optical filter 23 and the infrared detecting elements 12a, 12b in the infrared detecting apparatus 21 is much greater than the distance l between the optical filter 19 and the infrared detecting elements 12a, 12b in the conventional infrared detecting apparatus 1. Accordingly, the spreading angles $\theta_1$, $\theta_2$ of secondary heat radiation from a heat radiating portion 23a of the optical filter 23 to the infrared detecting elements 12a, 12b in the infrared detecting apparatus 21, are substantially the same, whereas, in the conventional infrared detecting apparatus 1, the spreading angles $\theta'_1$, $\theta'_2$ of secondary heat radiation from the heat radiating portion 19a of the optical filter 19 to the infrared detecting elements 12a, 12b are considerably different from each other. Thus, there is increased the signal cancel effect by both infrared detecting elements 12a, 12b in the present invention. For example, it is now supposed that L is set to 2.5 mm, l is set to 0.8 mm, the light receiving sizes of both infrared detecting elements 12a, 12b are set to 1 mm × 2 mm and the center distance of the infrared detecting elements 12a, 12b is set to 2 mm. In this case, the following equation is established:

$$\frac{(\theta_1 - \theta_2)^2}{(\theta'_1 - \theta'_2)^2} = \frac{1}{10}$$

Figure 4:
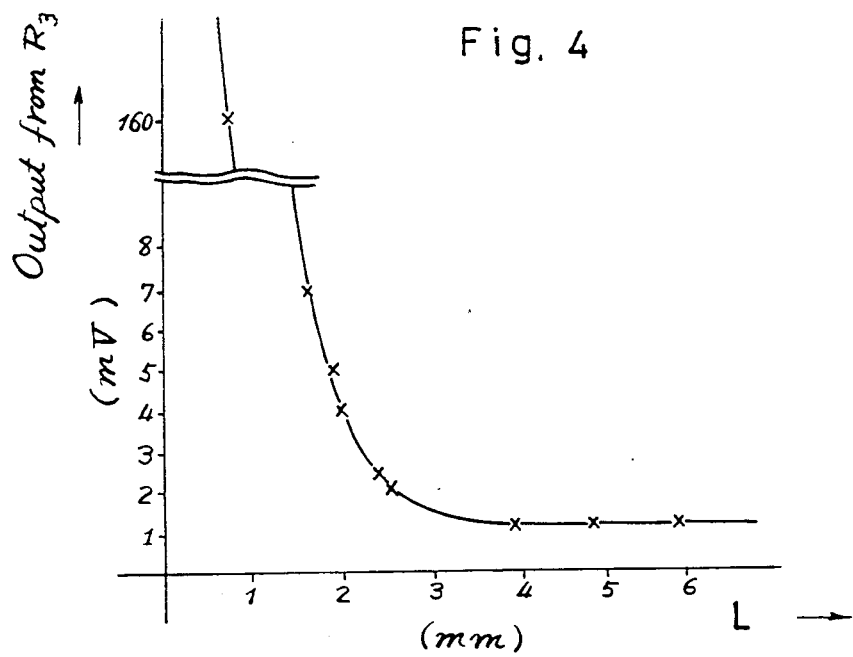
FIG. 4 is a view of detecting sensitivity characteristics illustrating the relationship between (i) the distance between the filter surface of the conductive optical filter and infrared detecting elements in FIG. 1 and (ii) an output voltage of the infrared detecting apparatus.

FIG. 4 shows the relationship between the actually measured output voltage in the circuit shown in FIG. 2 and the distance L between the conductive optical filter 23 and the infrared detecting elements 12a, 12b differentially connected as shown in FIG. 2, when the infrared detecting elements having typical light receiving sizes of 1 mm×2 mm are irradiated by external disturbing light. FIG. 4 shows that the distance L and the output voltage due to the external disturbing light are substantially in inverse proportion to each other in the area where L is small. As apparent from this characteristic diagram, when the distance L is set to 2 mm or more, there may be not only reduced the heat radiation in the conductive optical filter 23 due to the irradiation of the external disturbing light, but also obtained a cancel effect of the external disturbing light by the infrared detecting elements 12a, 12b. This enables the output voltage due to the external disturbing light to be lowered. Such an effect may be achieved by setting the distance L to 2 mm or more regardless of the sizes of the infrared detecting elements 12a, 12b.

The following description will discuss the grounds on which the distance L between the conductive optical filter 23 and the infrared detecting elements 12a, 12b has been set to $1/(8\pi)$ steradian or less as mentioned earlier.

As discussed in connection with FIG. 4, the infrared detecting elements 12a, 12b having typical sizes of 1 mm×2 mm is disposed as separated by 2 mm or more from the conductive optical filter 23. Accordingly, the solid angle in such an arrangement may be expressed by the following equation:

$$\frac{1 \times 2}{4\pi 2^2} = \frac{1}{2^3 \pi} = \frac{1}{8\pi}$$

More specifically, the fact that the distance L between the conductive optical filter 23 and the infrared detecting elements 12a, 12b having typical light receiving sizes of 1 mm×2 mm is set to 2 mm or more, is equivalent to the fact that the solid angle is set to $1/(8\pi)$ steradian or less. Accordingly, when the infrared detecting elements 12a, 12b have sizes greater than 1 mm×2 mm, the distance L between the infrared detecting elements 12a, 12b and the conductive optical filter 23 is set to a value greater than 2 mm such that the solid angle is equal to or smaller than $1/(8\pi)$ steradian. When the infrared detecting elements 12a, 12b have sizes smaller than 1 mm×2 mm, the solid angle is equal to or smaller than $1/(8\pi)$ steradian. Accordingly, the distance L may be set to a value smaller than 2 mm so that the effect similar to that above-mentioned is achieved.

Figure 6:
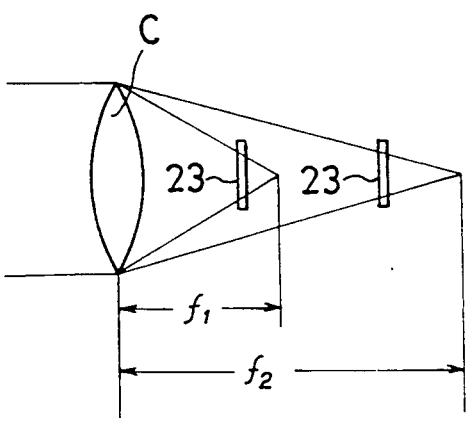
FIG. 6 is a view for illustrating the relationship between (i) the focal distance of an optical system to be combined with the apparatus of the present invention and (ii) the proper distance between the optical filter and the infrared detecting elements.

The characteristics shown in FIG. 4 undergo a slight change dependent on the focal distance of the optical system C to be combined. More specifically, when an optical system C having a great focal distance $f_2$ is used, there may not be properly achieved the reduction in heat radiation in the conductive optical filter 23 as well as the cancel effect by the infrared detecting elements 12a, 12b, unless the distance L between the conductive optical filter 23 and the infrared detecting elements 12a, 12b is set to a value greater than a value set when an optical system C having a small focal distance $f_1$, as shown in FIG. 6. However, it is found from the actual measurement results in FIG. 4 that, even in an optical system C having a great focal distance of, for example, 50 mm, the desired effects may be achieved as far as settings are made such that distance L is equal to or greater than 2 mm or the solid angle is equal to or smaller than $1/(8\pi)$ steradian.

Figure 7:
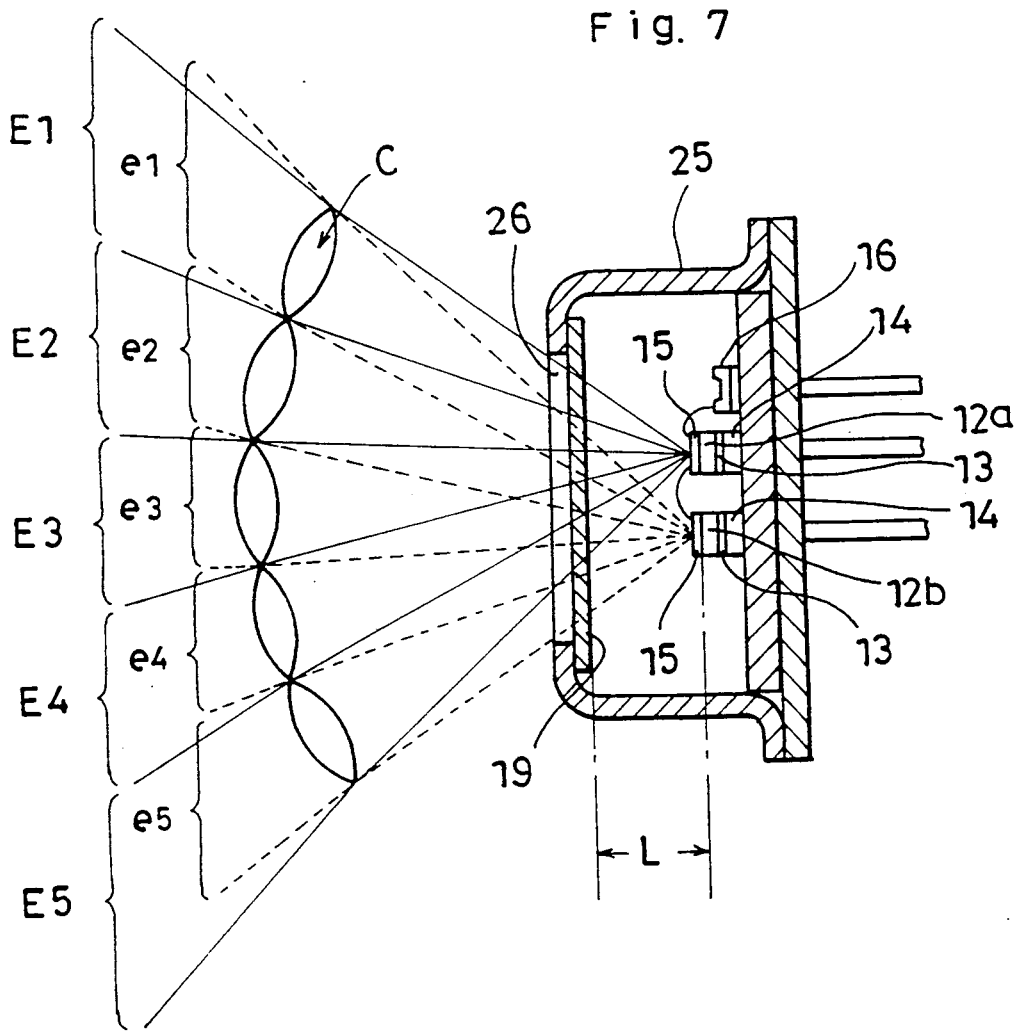
FIG. 7 is a section view in right-side elevation of an infrared detecting apparatus in accordance with a second embodiment of the present invention, as applied to a moving human body sensor of the infrared type.

FIG. 7 shows a second embodiment of the present invention, in which like parts and substantially equivalent parts are designated by like reference numerals used in FIG. 1.

In the embodiment shown in FIG. 1, the conventional infrared detecting unit 2 is used as it is and housed in the shield case 5. However, in the infrared detecting apparatus of the second embodiment, a case body 25 for housing a pair of infrared detecting elements 12a, 12b is formed in larger sizes, at the light incident side thereof, than those of the case 17 of the conventional infrared detecting unit 2. Further, an optical filter 19 to be attached to the case body 25 with an opening 26 thereof closed, is positioned such that the distance L between the filter surface of the optical filter 19 and the infrared detecting elements 12a, 12b is equal to or greater than 2 mm or such that the solid angle where the infrared detecting elements 12a, 12b are seen from an arbitrary point of the optical filter 19 is equal to or smaller than $1/(8\pi)$ steradian.

Accordingly, the infrared detecting apparatus of this second embodiment is securely prevented from being erroneously operated due to external disturbing light, likewise in the first embodiment. Further, this infrared detecting apparatus may be combined, independently from the circuit elements and the like, with the optical system C, so that a small-size moving human body sensor may be formed. In this second embodiment, the case body 25 may be preferably used as a shield case, and a conductive optical filter must be used as the optical filter 19. Preferably, the conductive optical filter is secured, by a conductive material, to the shield case to cover the opening thereof.

FIG. 8 shows main portions of a third embodiment of the present invention, while FIG. 9 is a section view in right-side elevation of the entire arrangement, including the main portions, of the third embodiment. In FIGS. 8 and 9, like parts and substantially equivalent parts are designated by like reference numerals used in FIGS. 1 and 7.

In the third embodiment, an infrared detecting unit 2 is similar to the conventional infrared detecting unit, and the distance l between the filter surface of an optical filter 19 and infrared detecting elements 12a, 12b is about 0.7 mm. The infrared detecting unit 2 is mounted on a circuit board 4 secured to a housing 27 of a moving human body sensor with screws 28, and is disposed in a case-shape housing space 29 formed in the housing 27. An external optical filter 30 similar to the optical filter 19 of the infrared detecting unit 2 is secured to the housing space 29 such that an opening 29a thereof is closed. The external optical filter 30 is positioned such that the distance L between the filter surface of the external optical filter 30 and the infrared detecting elements 12a, 12b is equal to or greater than 2 mm. The housing 27 is sealed, at the rear surface thereof, by a back plate 31.

In this third embodiment too, the infrared detecting apparatus may be prevented from being erroneously operated due to external disturbing light, since the distance between the external optical filter 30 and the infrared detecting elements 12a, 12b is equal to or greater than 2 mm. In addition, the infrared detecting apparatus of this embodiment has the following advantages.

In order to place the external optical filter 30 as separated by a distance of not less than 2 mm from the infrared detecting elements 12a, 12b, there may be disposed a dedicated attaching mechanism for merely holding the external optical filter 30. In this case, the entire arrangement becomes disadvantageously complicated. Accordingly, in the third embodiment, the housing space 29 for housing the infrared detecting unit 2 is formed in and integrally with the housing 27. The external optical filter 30 is secured to the housing space 29 such that an opening 29a thereof is closed. Thus, the external optical filter 30 also serves as a covering member of the opening 29a so that the infrared detecting unit 2 is sealed in the housing space 29 with no external influences exerted to the infrared detecting unit 2.

The housing 27 is covered, at the front surface thereof, with an optical system C' comprising a Fresnel lens group and a non-metallic cap member 27' for holding the optical system C'. This securely prevents the infrared detecting apparatus from being erroneously operated due to sudden changes in the temperature of the metallic case 5 caused by sudden changes in an environmental air stream, the direct sunlight and the like, as done in the conventional apparatus.

According to this third embodiment, since the external optical filter 30 is disposed, the optical filter 19 of the infrared detecting unit 2 is not specially required. Accordingly, the opening 18 may be sealed with a sealing member which transmits at least infrared rays, instead of the optical filter 19.

In the third embodiment, the housing space 29 is made in the form of a case. However, the housing space 29 may be made in the form of a concave. Further, the housing space 29 may be so arranged as to house not only the infrared detecting unit 2 but also a control circuit unit comprising a variety of circuit components 3.

Figure 10:
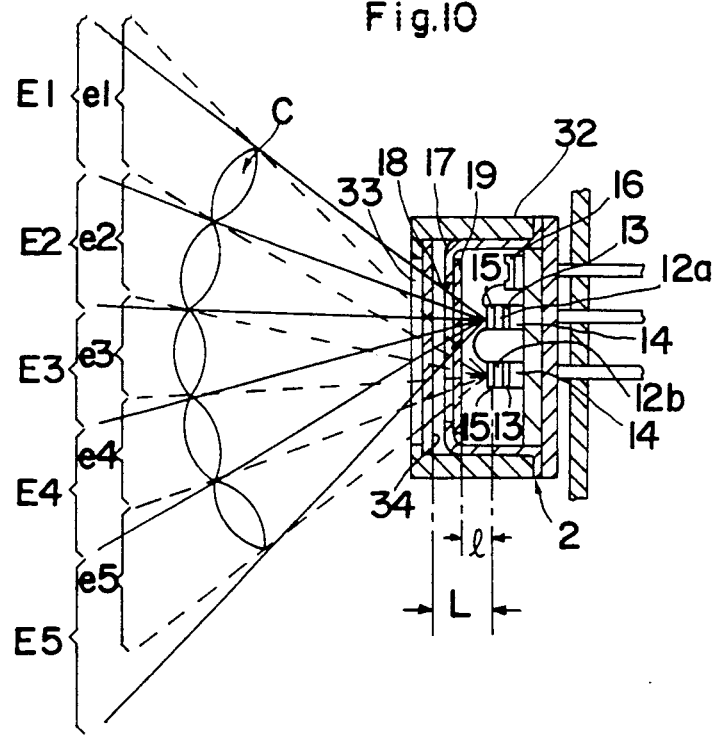
FIG. 10 is a section view in right-side elevation of an infrared detecting apparatus in accordance with a fourth embodiment of the present invention, as applied to a moving human body sensor of the infrared type.

FIG. 10 shows a fourth embodiment of the present invention. In FIG. 10, like parts and substantially equivalent parts are designated by like reference numerals used in FIG. 1.

In the fourth embodiment too, an infrared detecting unit 2 is similar to the conventional infrared detecting unit. The distance 1 between the filter surface of an optical filter 19 and infrared detecting elements 12a, 12b is about 0.7 mm. This infrared detecting unit 2 has a metallic case body 17, on which put is a case-shape protective member 32 made of a polymeric substance such as polymeric rubber or plastic. The protective member 32 has an infrared incident opening 33 opposite to the optical filter 19 and the infrared detecting elements 12a, 12b of the infrared detecting unit 2. An external optical filter 34 similar to the optical filter 19 is secured to the protective member 32 such that the opening 33 is closed. The external optical filter 34 is positioned such that the distance L between the external optical filter 34 and the infrared detecting elements 12a, 12b is equal to or greater than 2 mm.

In the fourth embodiment too, the infrared detecting apparatus may be prevented from being erroneously operated due to external disturbing light, since the external optical filter 34 is disposed as separated by 2 mm or more from the infrared detecting elements 12a, 12b. In addition, the infrared detecting apparatus presents the following advantages.

First, no needs exists for disposing a dedicated attaching mechanism for holding the external optical filter 34 as separated by 2 mm or more from the infrared detecting elements 12a, 12b. Further, to prevent the metallic case body 17 of the infrared detecting unit 2 from being changed in temperature due to the direct sunlight or a wind, the protective member 32 is disposed, and the external optical filter 34 is secured to the protective member 32 to close the infrared incident opening 33. Accordingly, the external optical filter 34 also serves as a sealing member of the opening 33. Thus, the protective member 32 and the filter 34 not only prevent the case body 17 from being heated by the direct sunlight, but also eliminate the influence of an air flow exerted upon the infrared detecting elements 12a, 12b. Further, the metallic case body 17 may be electrically insulated.

For applying the infrared detecting apparatus to a high-voltage apparatus, the protective member 32 may be molded around the infrared detecting unit 2 with the use of synthetic resin, thereby to form a more perfect electrically insulated structure. In this case, it is a matter of fact that the opening 33 is formed in the molded resin at a position opposite to the infrared detecting elements 12a, 12b, and that the external optical filter 34 is so attached as to seal the opening 33.

When the case body 17 of the infrared detecting unit 2 is made of a combustible material such as synthetic resin, the protective member 32 may be made of a non-combustible material such as metal, or a fire-retardant material, causing the protective member 32 to be refractory.

What is claimed is:

1. An infrared detecting apparatus comprising:
at least two infrared detecting elements for converting infrared rays into electric signals;
an electronic circuit for amplifying a difference signal due to a difference between output signals from two of said at least two infrared detecting elements;
an infrared filter for transmitting only infrared rays to said at least two infrared detecting elements, said infrared filter being positioned so that solid angles extending from an arbitrary point on the infrared filter to the peripheral edges of the at least two detecting elements are not larger than $1/(8\pi)$ steradian, said solid angles extending from an arbitrary point on the infrared filter to the peripheral edges of the at least two detecting elements for keeping said difference signal lower than a predetermined level when said at least two infrared detecting elements are irradiated by secondary infrared rays generated when said infrared filter is locally heated by being irradiated by a beam of visible light.

2. An infrared detecting apparatus comprising:
at least two infrared detecting elements for converting infrared rays into electric signals;
an electronic circuit for amplifying a difference signal due to a difference between output signals from two of said at least two infrared detecting elements;
an infrared filter for transmitting only infrared rays to said at least two infrared detecting elements, said infrared filter being positioned so that the distance between said infrared filter and the surfaces of said at least two infrared detecting elements is not less than 2 mm, said distance between said infrared filter and the surfaces of said at least two infrared detecting elements for keeping said difference signal lower than a predetermined level when said at least two infrared detecting elements are irradiated by secondary infrared rays generated when said infrared filter is locally heated by being irradiated by a beam of visible light.

3. An infrared detecting apparatus as set forth in claim 1 or 2, wherein the at least two infrared detecting elements and the electronic circuit are housed in a shield case made of a conductive material having a light receiving port for said at least two infrared detecting element, said light receiving port is sealed by the infrared filter, and said infrared filter is made of a conductive material.

4. An infrared detecting apparatus as set forth in claim 1 or 2, wherein said at least two infrared detecting elements are housed in an element housing space in the form of a concave formed in the outer surface of a housing case, and an opening of said element housing space is sealed by the infrared filter.

5. An infrared detecting apparatus as set forth in claim 1 or 2, wherein said at least two infrared detecting element are housed in a shell having a receiving window for receiving infrared rays, said shell is protected, at the outer periphery thereof, by a protective member which has an opening opposite to said receiving window and which is made of a material different from that of said shell, and said opening is sealed by the infrared filter.

* * * * *